June 26, 1923.
A. C. DAY
1,460,194
MECHANICAL MOVEMENT
Filed April 6, 1921
2 Sheets-Sheet 1
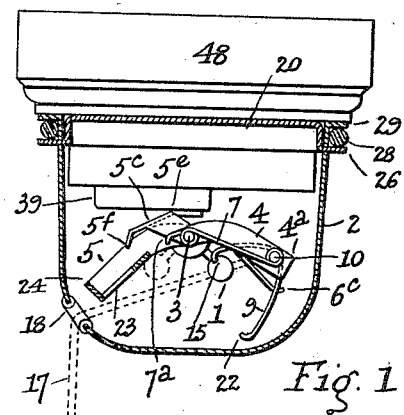
Fig. 1
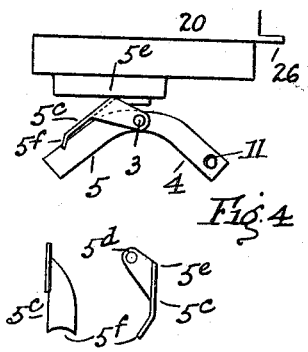
Fig. 4
Fig. 6  Fig. 5
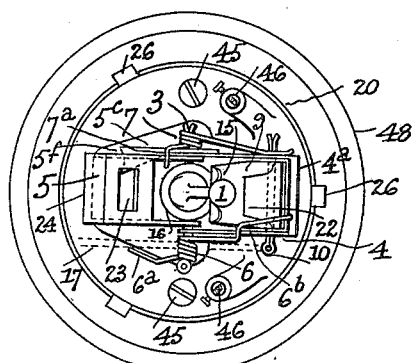
Fig. 2
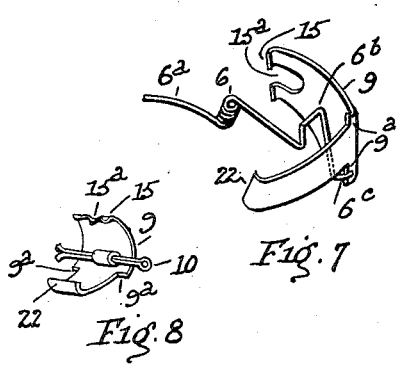
Fig. 7
Fig. 8
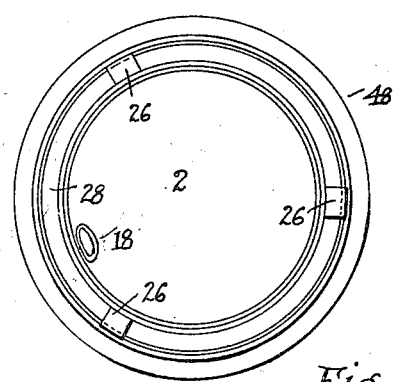
Fig. 3
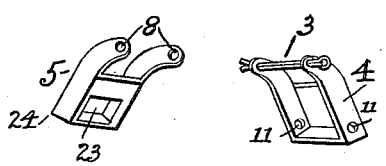
Fig. 10  Fig. 9
Inventor:
Alfred C. Day
By Wm E Boulter
Attorney June 26, 1923.

A. C. DAY 1,460,194

MECHANICAL MOVEMENT

Filed April 6, 1921

Inventor:
Alfred C. Day
By Wm E Boulter
attorney

Patented June 26, 1923.

1,460,194

UNITED STATES PATENT OFFICE.

ALFRED CARLYLE DAY, OF MELBOURNE, VICTORIA, AUSTRALIA.

MECHANICAL MOVEMENT.

Application filed April 6, 1921. Serial No. 458,872.

*To all whom it may concern:*

Be it known that I, ALFRED CARLYLE DAY, a subject of the King of Great Britain and Ireland, residing at 31 Queen Street, Melbourne, in the State of Victoria, Commonwealth of Australia, have invented certain new and useful Improvements in Mechanical Movements; and I do hereby declare the following to be a full, clear, and exact description of the invention, such as will enable others skilled in the art to which it appertains to make and use the same.

This invention relates to improvements in mechanical movements or mechanism for operating a pivoted lever and more particularly adapted for electrical switches of tumbler type, to be fitted to walls, ceilings, and so on, and having a cord to be pulled to open or close the circuit. Although other means exist for distance operation, they involve undesirable features which I avoid.

In the drawings herewith construction according to my invention is illustrated, applied to a switch of the said type, but known parts such as electrical contacts and wires thereto are not illustrated.

The invention is not limited to the minor details shown where modification is obviously feasible while retaining matter hereinafter claimed.

Figure 1 shows part of a tumbler switch in side elevation, with its cover in vertical section. The circuit is open when the tumbler is located as in firm lines, and closed when the tumbler is located as in dotted lines.

Figure 2 shows the parts in Figure 1 seen from beneath, omitting the cover.

Figure 3 is a view from beneath of the covered switch of Figure 1, omitting the cord.

Figure 4 shows in working position a detail of Figure 1, and Figures 5 and 6 show from different points of view the detail detached.

Figure 7 is a perspective diagram on a larger scale of a hooking plate, and its spring, and Figure 8 shows in perspective the hooking plate and its pivot pin.

Figure 9 shows a hook frame in perspective.

Figure 10 shows a catch frame in perspective.

Figure 11:
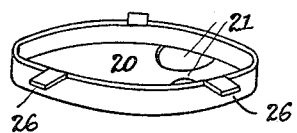
Figure 11 shows the base ring of the cover.
Figure 13:
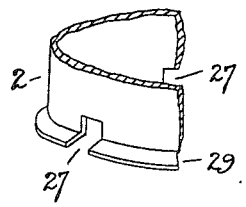
Figure 13 shows part of the cover in perspective.
Figure 12:
Figure 12 shows a spring ring for securing the cover.

Instead of the usual short axial pin on which the tumbler is commonly mounted, I use an elongated pin 3 as the axis of the tumbler and of a hook frame 4, a catch frame 5, and at opposite sides of the framing, springs 6 and 7 which press the frames apart, and return them to that position after they have been moved therefrom. These frames can be rocked, but when at rest are located one at each side of the tumbler. The pin 3 extends as in Figure 9 through holes in frame 4, and through holes 8 in frame 5. A bent stay $5^c$ is mounted on pin 3 by means of hole $5^d$ and has a part $5^e$ bearing on the switch base, and an arm with an end $5^f$, shown recessed, to act as a positioning abutment for frame 5, at one side of which it is located. This stay enables the position into which frame 5 is pressed in the direction of the stay to be regulated, for which purpose the stay arm may be bent if necessary to adjust the position of its end $5^f$.

9 is a hooking plate shown of bow shape having a head hook 22 and mounted on an elongated pin 10 which extends through holes 11 near the head $4^a$ of frame 4.

Figure 14:
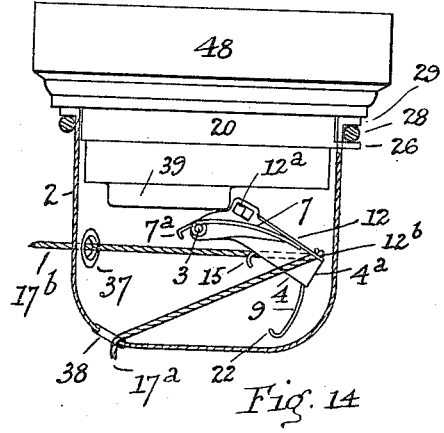
Figure 14 shows in section a cover with internal parts arranged for the use of two cords the pulling of either of which will open the circuit when it is closed and will close it when it is open.
Figure 15:
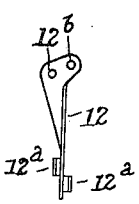
Figures 15, 16, 17 show from different points of view a detail of Figure 14.
Figure 16:
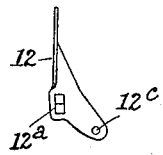
Figure 17:
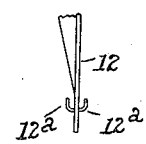

$9^a$ are shoulders on plate 9. The spring 6 has, as shown in Figure 7, a coil from which extends in one direction a limb $6^a$ which presses the base of the switch and in the opposite direction a body $6^b$ which presses plate 9, the body being continued to form an end $6^c$ which grasps either shoulder $9^a$. This spring is omitted from Figure 14 to allow other parts to appear clearly. Pin 3 passes through the coil of this spring.

The tumbler socket or boss 16 acts as a backstop for member 9, which to accommodate the tumbler shank has a tail 15 recessed at 15ª. This tail at certain times advances, meets the tumbler, and throws it to its other position, spring 6 acting thereupon to return member 9 to its position of rest.

With the switch "off" as in Figure 1, the effect of pulling its cord, marked 17, is to swing frame 4 towards frame 5, so that tail 15 meets the knob and the resistance of the latter makes the tail swing on its pivot, and (the pull on the cord continuing) the knob makes tail 15 press the back of hook frame 4, which also moves on its pivot, and this causes switching of the knob.

During this motion hook 22 does not engage frame 5 (owing to pressure of the knob on tail 15) but passes through an aperture 23 in it. That action moves part of spring 6, which, when cord 17 is released, returns hook frame 4 to its position of rest, but leaves the knob in the dotted position in Figure 1, near frame 5.

The cord when next pulled draws hook frame 4 towards frame 5 and member 9 so advances to frame 5 that its hook 22 passes over and engages an edge 24 of that frame. Retraction occurs when the cord is released, owing to hook frame 4 being returned by spring 6 and during the retraction, hook 22 draws with it the catch frame 5, a surface of which thus meets and presses knob 1, and switches the latter to its "off" position.

Then the socket or boss 16 is struck by the said tail so that hook 22 is swung clear from the catch frame, which returns to its rest position by reason of the pressure of an arm 7ª of the spring 7. From frame 4 the cord 17 extends through an eyelet 18 in the cover 2.

To fit the cover in place it has apertures 27 into which engage projections 26 on a plate 20, which is held against a block 48 by ordinary means; for example in Figure 11 plate 20 has holes 21 to admit screws and electrical connections the use of which is well understood. The expansible spring ring 28 is, for fastening purposes, located between projections 26 and the flange 29 on the cover.

Figure 18:
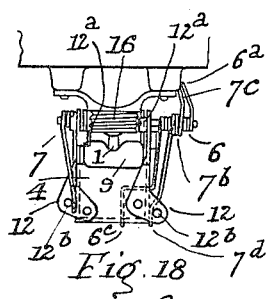
Figure 18 shows parts of Figure 14 in elevation as seen from the right.

In the two cord switch the cords, 17ª, 17ᵇ pass through cover eyelets 37, 38. During the action of cord 17ª or 17ᵇ the other of these cords remains at rest. There is supported on pin 3 (which carries springs 6 and 7 frame 4,—and frame 5, not shown in Figure 18) another spring 7ᵇ (not required when only one cord is used) the coil of which is loose around that of spring 6; and in addition a pair of levers 12 one at each side, each having a hole 12ᶜ for pin 3 and hooks 12ª, (one projecting at each side) to allow of pivoting the lever so that either of the holes is used according to suitability.

Each side of part 4 is engaged by a hook of a lever 12. Each lever also has two cord holes 12ᵇ, of which whichever is suitable will be used as required by having a cord connected thereto. Thus each lever is made right and left handed so as to avoid the need of employing two different levers, each with a differently located hook and cord hole; though the latter may be used if preferred in any instances.

One end 7ᶜ of spring 7ᵇ abuts on the switch base, and the other end 7ᵈ presses on a lever 12. Spring 7 in Figure 18 also presses on a lever 12, instead of (as in Figures 1 and 2) on pin 10. When cord 17ª or 17ᵇ is pulled it draws with it its lever 12, which engages with a side of member 4, and functions the mechanism as described in respect of the use of cord 17.

What I claim is:—

1. In mechanism of the character described, the combination with two pivoted frames, a hooked member pivotally carried by one of the frames and adapted to engage with the other of said frames, means for swinging in one direction the frame carrying the hooked member to effect the engagement of the latter with the other frame, and means for swinging the hooked member and frame after engagement in the opposite direction, of a pivoted tumbler adapted to be oscillated in opposite directions when the frames are operated as set forth.

2. In mechanism of the character described, the combination with two pivoted frames, a hooked member pivotally carried by one of the frames and adapted to engage with the other of said frames, means for swinging in one direction the frame carrying the hooked member to effect the engagement of the latter with the other frame, and a spring arranged to return each frame and the hooked member, after movement thereof, to normal position, of a pivoted tumbler adapted to be oscillated in opposite directions when the frames are operated in the manner described.

3. In mechanism of the character described, the combination with two pivoted frames, and a pivoted tumbler arranged between said frames, one of said frames being adapted to throw the tumbler in one direction and the other frame being adapted to throw said tumbler in the opposite direction, of springs arranged to return the frames to normal position after having been moved therefrom, and a hooked member pivotally carried by one of the frames and having a head hook and a tail adapted to cooperate with the tumbler and the other frame in the manner and for the purpose set forth.

4. In mechanism of the character described, the combination of two pivoted frames, an operating cord attached to one of the frames, a tumbler arranged to be thrown into one position by pulling the cord, and, after releasing the cord to be thrown into the other position by again pulling and releasing the cord, one of the said frames extending on one side of said tumbler and the other frame extending on the other side thereof, and a hooked member pivoted to the frame to which the cord is attached and operating to engage the other frame in the manner set forth.

5. In mechanism of the character described, the combination with two pivoted frames, and a pivoted tumbler arranged between said frames, one of said frames being adapted to throw the tumbler in one direction and the other frame being adapted to throw said tumbler in the opposite direction, of springs arranged to return the frames to normal position after having been moved therefrom, a hooked member carried by one of the frames and having a head hook and a tail, the latter being adapted to be actuated by the tumbler to effect the tilting of the hooked member when the frame carrying it is first moved toward the other frame without actuating the latter, and said head hook being adapted to engage with the last named frame when the frame carrying the hooked member is again moved as described, and means for actuating the hooked member to cause its head hook to release the frame.

6. In mechanism of the character described, the combination with two pivoted frames, of a tumbler pivotally arranged between said frames, said frames being adapted to swing the tumbler in opposite directions in the manner and for the purpose set forth.

In witness whereof I have hereunto set my hand.

ALFRED CARLYLE DAY.